(No Model.)  2 Sheets—Sheet 1.

F. BRANDENBURG.
CALCINING OR ROASTING FURNACE.

No. 588,949. Patented Aug. 31, 1897.

Witnesses:

Inventor:
Franz Brandenburg
per Martin Schmetz
Attorney.

(No Model.) 2 Sheets—Sheet 2.

F. BRANDENBURG.
CALCINING OR ROASTING FURNACE.

No. 588,949. Patented Aug. 31, 1897.

Witnesses.
Charles A. Tondeur
Johann Feifel

Inventor
Franz Brandenburg
per Martin Schmetz
Attorney

UNITED STATES PATENT OFFICE.

FRANZ BRANDENBURG, OF LENDERSDORF, GERMANY.

CALCINING OR ROASTING FURNACE.

SPECIFICATION forming part of Letters Patent No. 588,949, dated August 31, 1897.

Application filed November 24, 1896. Serial No. 613,267. (No model.)

*To all whom it may concern:*

Be it known that I, FRANZ BRANDENBURG, a citizen of Germany, residing at Lendersdorf, near Düren, in the Kingdom of Prussia, Germany, have invented a new and useful Improvement in Arrangements for Continual Calcining or Roasting, of which the following is a specification.

In the calcining or roasting furnaces provided with roasting-pans hitherto used the material to be treated was introduced at one end of the pan and discharged from the other end, so that in such process if the calcining or roasting was not complete enough the material had to be recharged into the pan by the workman.

The present invention enables the calcining or roasting process to go on automatically as long as necessary without interruption. I attain this object by the arrangement illustrated in the accompanying drawings, in which—

Figure 1:
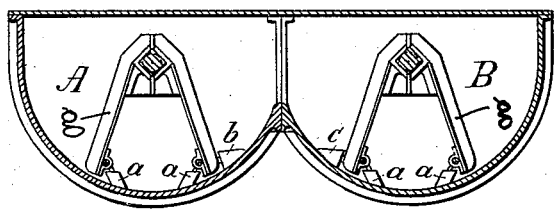
Figure 2:
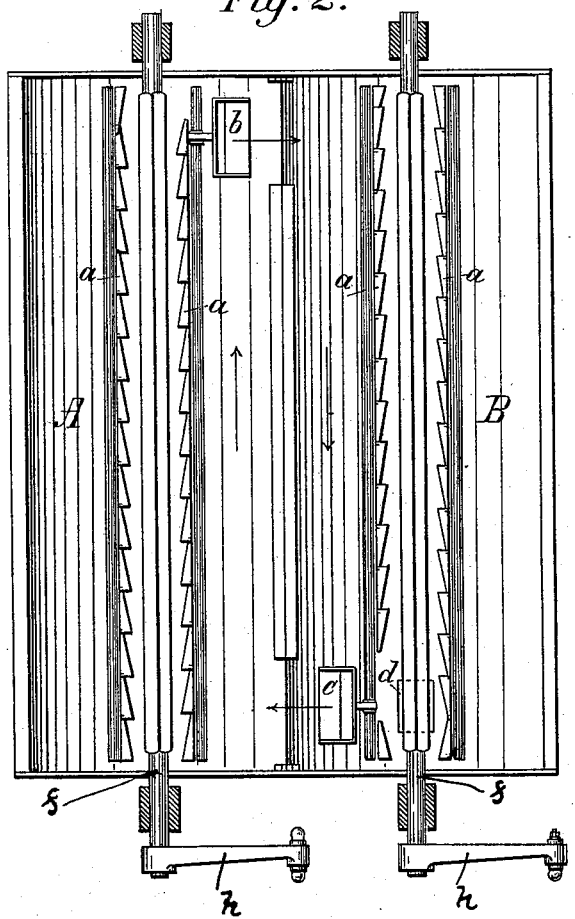
Figure 3:
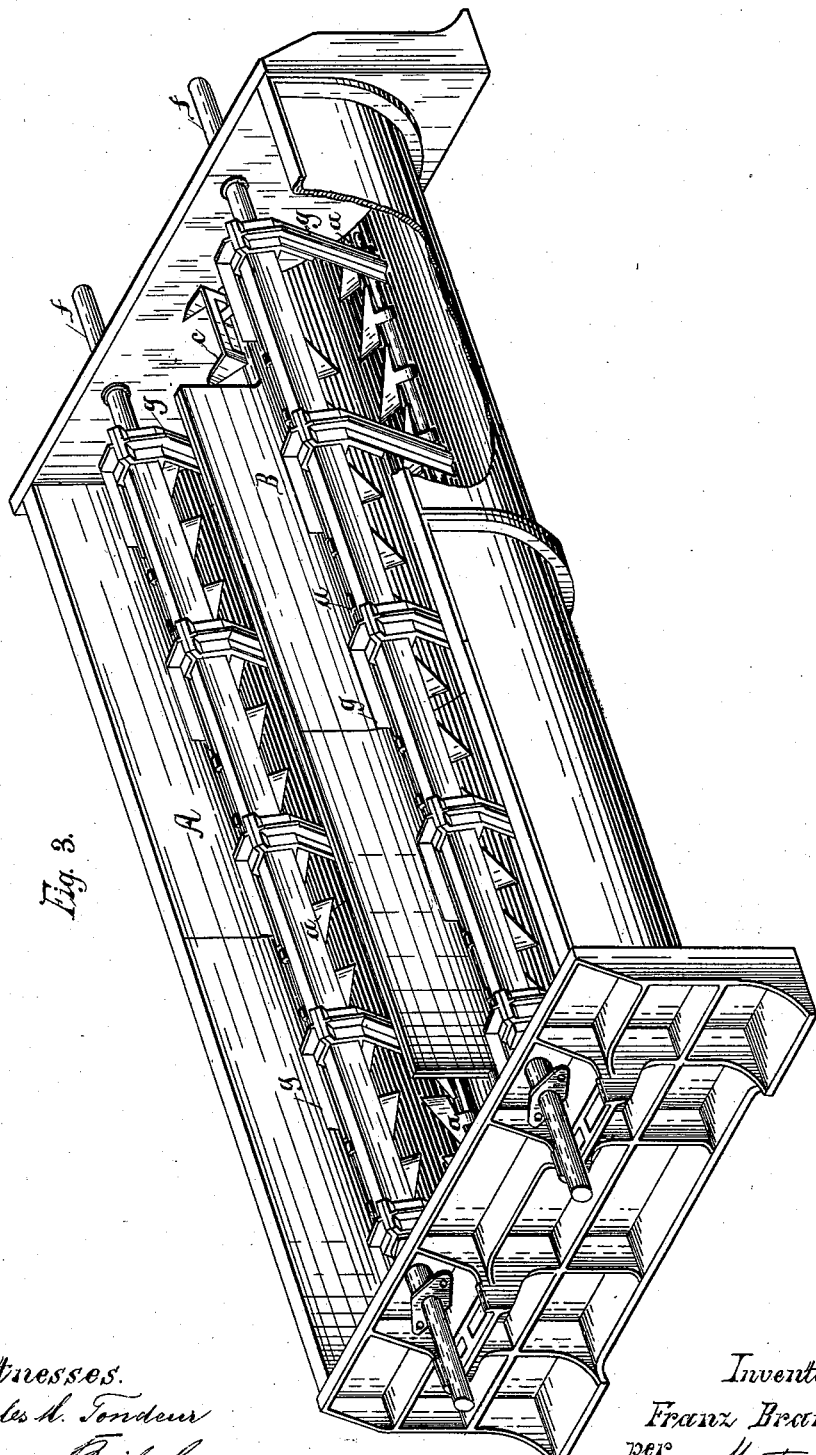

Figure 1 is a section; Fig. 2, a plan with the cover removed, and Fig. 3 a perspective view.

The apparatus consists, first, of two calcining or roasting pans A B, longitudinally connected together; second, of two vibrating frames $g$ $g$, properly connected to shafts $f$ $f$, which are provided with cranks $h$ $h$ in the manner shown, and, third, of a series of stirrers $a$ $a$, which are pivoted to said vibrating frames and operated to transport the material from one end of the pan to the other end.

To transport the material from one pan into the other pan, I arrange two discharge-shovels $b$ $c$ and secure them in opposite directions on each of the vibrating frames in the manner shown.

The consecutive operation of the apparatus when used for calcining and roasting is as follows: The shafts $f$ $f$ and the vibrating frames $g$ $g$ are made to vibrate at one time in the same direction by means of the cranks $h$ $h$, secured on said shafts and connected together, by which means the stirrers $a$ $a$ are constantly transporting the material from one end of the pan to the other end. The path of the material is shown by the arrows in Fig. 2. Now the pans are connected longitudinally in such manner that the material to be treated is, by the discharge-shovel of the pan A, introduced into the pan B, and at the other end, by the discharge-shovel of the other pan B, is introduced into the first pan A, and so on, being thus circulated till the material is sufficiently calcined or roasted. The material is discharged from the pans through a door $d$ in one of the pans.

In consequence of the calcining or roasting proceeding automatically the space in which the calcining apparatus is arranged may remain closed during the process. Thus in cases when poisonous dust is developed during the calcining or roasting—as, for instance, in the manufacture of minium—the breathing of this dust by the workmen is avoided. Moreover, it becomes possible to use hot air in roasting or calcining, which is introduced into the closed space of the calcining-chamber.

Having now particularly described and ascertained the nature of the said invention and in what manner the same is to be performed, I declare that what I claim is—

In a calcining or roasting apparatus the combination of two pans, connected to each other side by side, a series of stirrers vibrating therein, pivoted to two vibrating frames, properly connected to shafts and made to vibrate by means of two cranks, secured on said shafts, two discharge-shovels being also secured on said vibrating frames and disposed in such manner that the discharge-shovel of one pan throws the material into the other pan and the discharge-shovel of the latter pan in turn throws the material in the first pan, and so on, thereby effecting a continuous circulation of the material to be calcined or roasted, substantially as described and illustrated in the accompanying drawings.

In testimony that I claim the foregoing as my invention I have signed my name in presence of two subscribing witnesses.

FRANZ BRANDENBURG.

Witnesses:
JOHN HECKMANNS,
W. C. EMMET.